Patented July 26, 1932

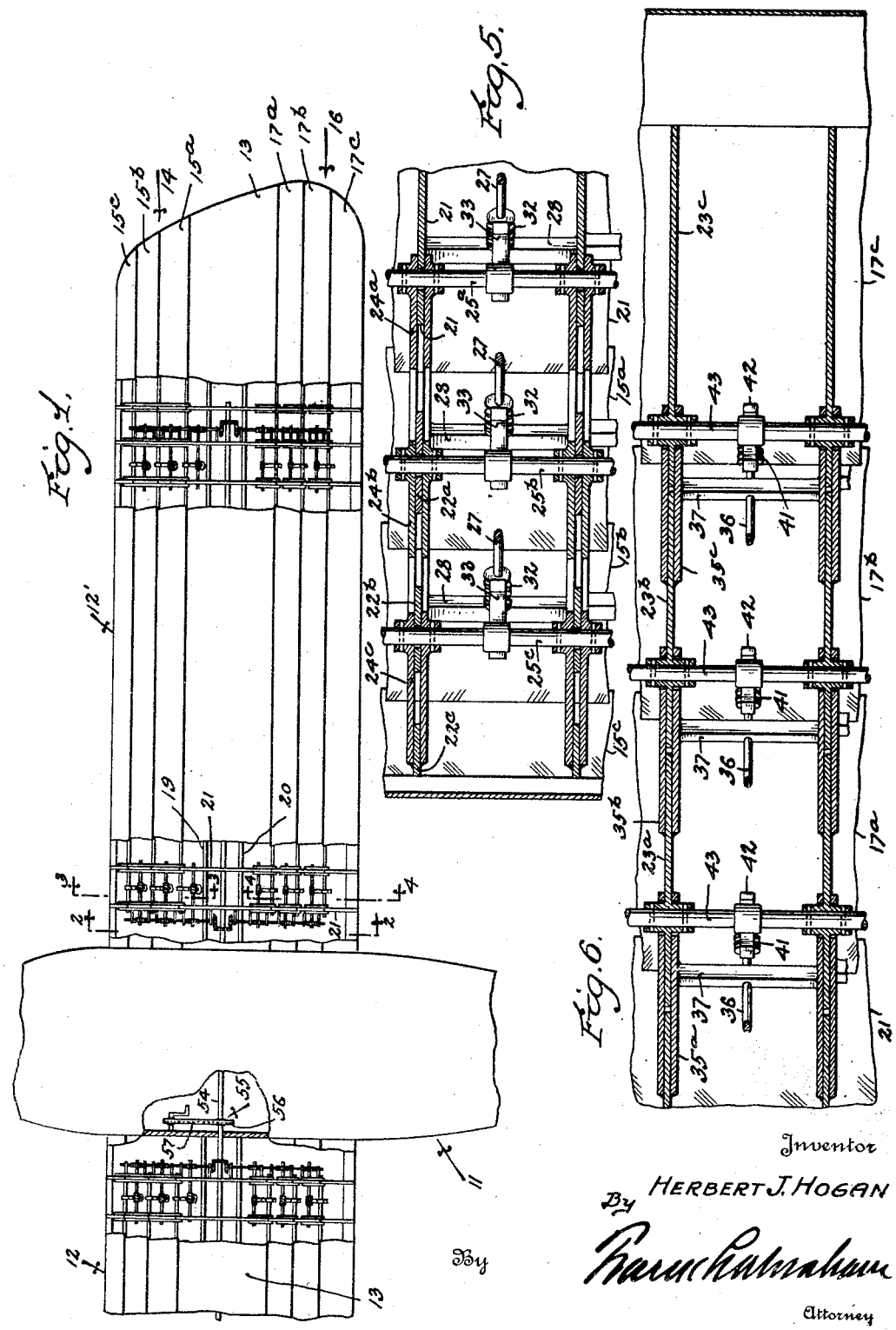

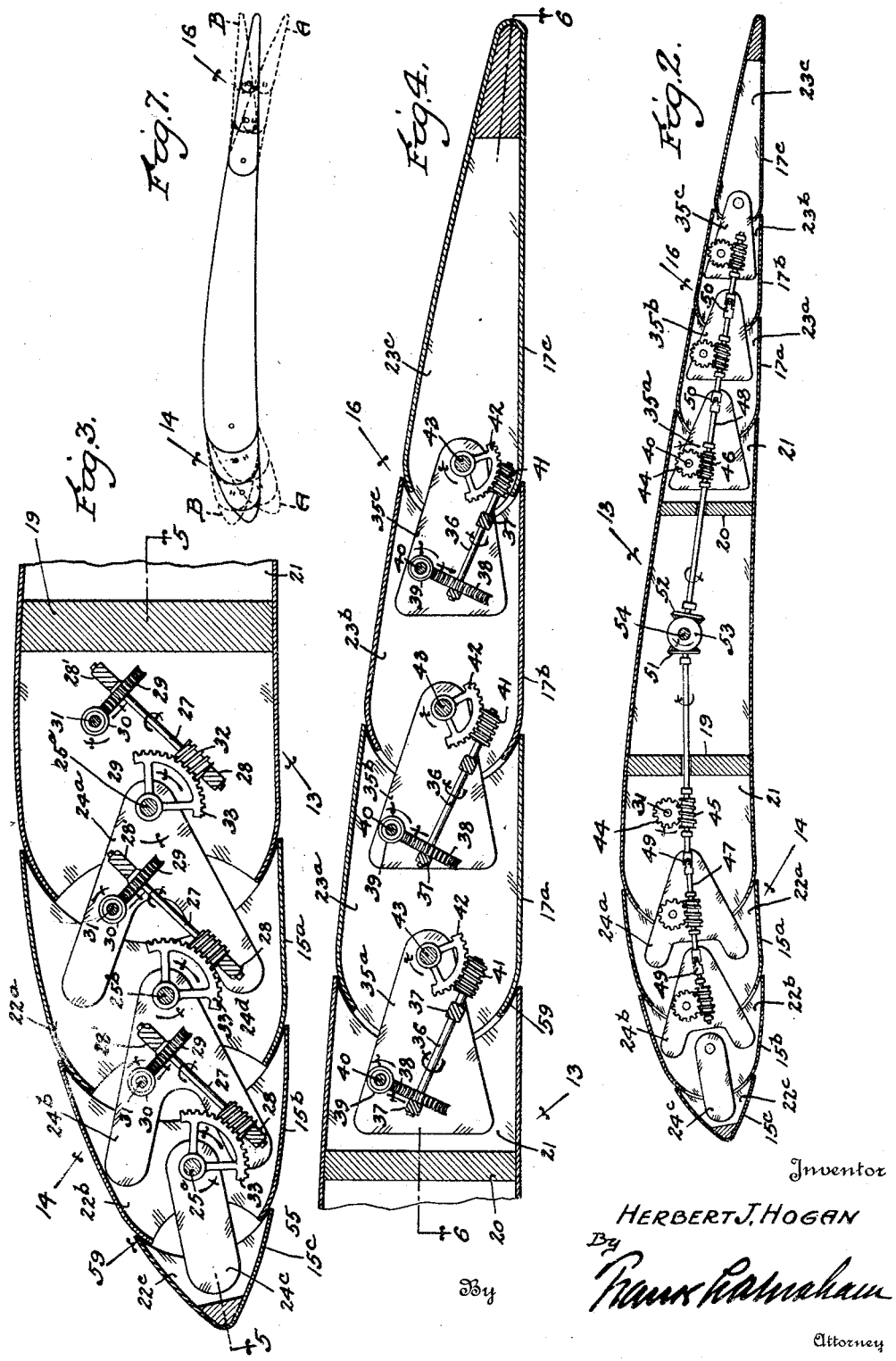

1,868,748

UNITED STATES PATENT OFFICE

HERBERT J. HOGAN, OF LOS ANGELES, CALIFORNIA

VARIABLE CAMBER AIRFOIL

Refile of abandoned application Serial No. 310,575, filed October 5, 1928. This application filed November 28, 1931. Serial No. 577,799½.

This invention relates to an airfoil or wing construction adapted for use in combination with airplanes and embodies an organization by means of which the camber of the airfoil may be adjusted by the pilot to suit the conditions under which the plane is operating.

It is well known to those familiar with the art that the "lift" and "drag" upon an airplane wing during its flight, are factors which are governed largely by the camber or convexity of the wing. In other words, an airfoil having a camber designed to give a maximum or high lift is not adapted for use on a plane which will satisfy a demand for high velocity while in the air.

It is possible by means of a high camber in the airfoil to "get away" from the ground quickly and to land at a relatively low velocity, but as was previously stated, a plane of this character is not adapted to be flown at a high speed. Numerous attempts have been made to develop a wing construction for airplanes by means of which the ratio between the lift and drag upon the wing may be varied to permit the plane to land and to "get away" at low speed and at the same time to provide a construction in which the plane may be flown at a high speed. There are three principal methods of attacking this problem, one of which is to provide a wing having a variable area, the second is to provide a wing with forward slots or openings which may be adjusted to produce the desired characteristic, and the third method, which applicant has employed and which should theoretically be the most successful, is to vary the camber of the wing.

In the last mentioned method means must be provided for adjusting the camber or convexity of the wing at any time to produce the desired lifting characteristics and, in such an organization, it should be possible to set the camber while the plane is on the ground to produce a maximum lifting power in the wings at low speed, making it possible for the plane to leave the ground in a relative short distance without necessitating the high velocity generally employed. When the plane is in the air, the camber can be set to accommodate the plane for maximum speed conditions or varied to meet ordinary cruising conditions, and while the plane is being brought to the ground or landed, the camber can again be adjusted for producing maximum lift, this adjustment making it possible to bring the plane to the ground at a low speed.

It is therefore an object of this invention to produce an organization of the class described in which the camber of the wing may be adjusted by the pilot to suit the particular conditions under which the plane is operating.

It is a further object of the invention to develop a device of the character described which is sturdy and light in construction and is positive in its operation.

The general construction of this invention embodies an airfoil comprising a main longitudinal center section which may be defined as being substantially rigid or positionally fixed relative to the fuselage. Pivotally attached to the forward and rear edges of this center section are an adjustable front section and an adjustable rear section respectively.

These mentioned adjustable sections embody a plurality of panels which are pivotally connected to each other to form units, the units in turn being pivotally connected to the fixed section.

Means are provided for moving the panel units rotatably about the edges of the main center section, such movement being effective to vary the convexity or camber of the entire wing section.

In the preferred form of the invention, this last mentioned movement is imparted to the units through a system of worm and beveled gears which are controlled from a main drive shaft which in turn is adapted to be operated from a point in the pilot's cockpit.

Details in the construction of the invention, together with other objects attending its production, will be better understood from the following description of an illustrated embodiment thereof as shown in the accompanying drawings in which, Fig. 1 is a diagrammatic plan view of an airplane having parts broken away to illustrate the assembly of the invention.

Fig. 2 is an enlarged sectional elevation taken substantially in a plane represented by the line 2—2 in Fig. 1.

Fig. 3 is an enlarged partial sectional elevation taken substantially in the plane represented by the line 3—3 in Fig. 1.

Fig. 4 is an enlarged partial sectional elevation taken substantially in a plane represented by the line 4—4 in Fig. 1.

Fig. 5 is an enlarged sectional plan view taken substantially in a plane represented by the line 5—5 in Fig. 3.

Fig. 6 is an enlarged sectional plan view taken substantially in a plane represented by line 6—6 in Fig. 4.

Fig. 7 is a diagrammatic view illustrating the manner in which the camber of the airfoil may be adjusted by means of this invention.

More particularly describing the invention as illustrated in the drawings, reference numeral 11 indicates the fuselage of an airplane which is provided with wings or airfoils 12 and 12', each of the wings embodying a main center section 13 which is substantially rigid and may be described as being positionally fixed.

Mounted upon the forward or leading edge of each wing, is an adjustable front section 14 which comprises a plurality of panels indicated by reference numerals 15a, 15b and 15c, such panels being pivotally connected with each other, as will be hereinafter described, to form a single unit, and the rear panel 15a of this unit, which is adjacent the center section 13, is pivotally connected to the forward edge of the section as will also be hereinafter described.

The wings 12 and 12' also embody adjustable rear sections indicated by reference numeral 16, each of which comprises panels 17a, 17b and 17c, these panels being interconnected with each other and pivoted to the main center section 13 in a manner similar to that used in the panels 15a, 15b and 15c. It will be noted that the outer surfaces of the panels are tapered away from the edges of the center section to provide an entire wing section of uniform curvature.

The center section 13 embodies spar members 19 and 20 which may be of any preferred form commonly used in airplane construction and, for the purpose of maintaining shape and rigidity in this section, a plurality of fixed rib members are mounted therein, such members being indicated by reference numeral 21.

Each of the panel members 15a, 15b and 15c, and 17a, 17b and 17c, respectively, is provided with what may be termed segmental rib members, such members being indicated by reference numerals 22a, 22b and 22c, and 23a, 23b and 23c, respectively.

Forward control or pivot plates 24a are pivotally mounted upon the fixed center rib members 21 by means of pivot shafts 25a. These control plates 24a are attached to the segmental rib members 22a in any suitable manner such as by means of welding.

It will be understood that the pivotal movement of the control plates 24a, about the pivot shafts 25a, will impart movement to the rib segments 22a and, as illustrated in Fig. 3, a second set of pivot shafts 25b extend through the rib segments 22a, each of these shafts having rigidly mounted thereon control plates 24b. The forward end of the control plates 24b are in turn attached to the rib segments 22b and the pivotal movement imparted thereto by means of the shafts 25b is effective to impart rotation to the panel 15b, of which these rib members 22b are elements.

A third set of pivot shafts 25c are supported in the rib segments 22b and control plates 24c are rigidly attached thereto, such control plates being in turn connected with the segmental rib members 22c and rotation of the shaft 25c is in turn effective to impart movement to the panel 15c, of which the rib segment 22c is an element.

Means are provided for simultaneously imparting movement to these members, such means embodying a plurality of intermediate shafts indicated by reference numeral 27. These shafts are supported by suitable cross-bearing members 28 and 28', the bearing members being mounted in any suitable manner between adjacent parallel pivot plates.

The shafts 27 are upwardly provided with worm wheels 29, each of which is in turn adapted to receive rotation from a worm 30 mounted upon suitable control shafts indicated by reference numeral 31. The lower ends of the shafts 27 are provided with worms 32 which in turn engage worm wheel segments 33, the worm wheel segments being mounted upon the pivot shafts 25a, 25b and 25c.

It will be understood from this construction that a synchronous rotation of all of the control shafts 31 is effective to impart a simultaneous movement to all three of the panels 15a, 15b and 15c, the motion of the parts being indicated by the arrows in Figs. 2, 3 and 4.

The construction of the rear adjustable section 16 is similar to that of the front adjustable section 14, each of the panels 17a, 17b and 17c being provided with segmental beams or ribs 23a, 23b and 23c. The segmental beams are in turn pivotally connected with each other by means of the pivot or control plate sections 35a, 35b and 35c, the forward segmental beam 23a being pivotally 4. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts; segmental ribs secured to said pivot plates and adapted to receive segmental rotation about the edges of said center section, said segmental ribs being embodied in panel units tapering outwardly from said center section to form a uniformly surfaced airfoil, control shafts rotatably supported by said pivot plates and gear means connecting said control shafts with said pivot shafts for imparting movement from said control shafts to said segmental ribs.

5. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts; segmental ribs secured to said pivot plates and adapted to receive segmental rotation about the edges of said center section, said segmental ribs being embodied in panel units tapering outwardly from said center section to form a uniformly surfaced airfoil, control shafts rotatably supported by said pivot plates and gear means connecting said control shafts with said pivot shafts for imparting movement from said control shafts to said segmental ribs, each of said gear means comprising a worm on the control shaft, an interconnecting shaft supported by oppositely disposed pivot plates, a worm wheel on one end of said interconnecting shaft, engaging said control shaft worm, a worm on the opposite end of said interconnecting shaft, and a gear member mounted on said pivot shaft in engagement with said last mentioned worm.

6. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts, segmental ribs secured to said pivot plates and adapted to receive segmental rotation about the edges of said center section, said segmental ribs being embodied in panel units tapering outwardly from said center section to form a uniformly surfaced airfoil, control shafts rotatably supported by said pivot plates and gear means connecting said control shafts with said pivot shafts for imparting movement from said control shafts to said segmental ribs, and a main drive shaft adapted to synchronously rotate said control shafts.

7. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts, segmental ribs secured to said pivot plates and adapted to receive segmental rotation about the edges of said center section, said segmental ribs being embodied in panel units tapering outwardly from said center section to form a uniformly surfaced airfoil, control shafts rotatably supported by said pivot plates and gear means connecting said control shafts with said pivot shafts for imparting movement from said control shafts to said segmental ribs, and a main drive shaft adapted to synchronously rotate said control shafts, and means in the cockpit of said airplane for operating said main drive shaft.

8. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts, segmental ribs secured to said pivot plates and adapted to receive segmental rotation about the edges of said center section, said segmental ribs being embodied in panel units tapering outwardly from said center section to form a uniformly surfaced air foil, control shafts rotatably supported by said pivot plates and gear means connecting said control shafts with said pivot shafts for imparting movement from said control shafts to said segmental ribs, each of said gear means comprising a worm on the control shaft, an interconnecting shaft supported by oppositely disposed pivot plates, a worm wheel on one end of said interconnecting shaft, engaging said control shaft worm, a worm on the opposite end of said interconnecting shaft, and a gear member mounted on said pivot shaft in engagement with said last mentioned worm, and a main drive shaft adapted to synchronously rotate said control shafts.

9. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts, segmental ribs secured to said pivot plates and adapted to receive segmental rotation about the edges of said center section, said segmental ribs being embodied in panel units tapering outwardly from said center section to form a uniformly surfaced airfoil, control shafts rotatably supported by connected with the main center beam 21 by means of the pivot plate section 35a.

Interconnecting shafts 36 are mounted upon the respective plate members by means of suitable bearings 37. The upper ends of these shafts are provided with worm wheels 38, which engage control shaft worms 39 mounted on control shafts 40, and the lower ends of these interconnecting shafts are provided with worms 41 adapted to engage segmental gears 42 mounted upon pivot shafts 43.

The worms 39 mounted upon the control shafts 40 are adapted to be synchronously rotated to effect the movement of all three panels in a manner similar to that described above.

The manner of governing the operation of the forward and rear sets of control shafts 31 and 40, respectively, is best illustrated in Fig. 2 in which each of the shafts is illustrated as being provided with worm wheels 44. These worm wheels are in turn engaged by suitable worms indicated at 45 and 46, respectively, which are mounted upon suitable shaft sections 47 and 48, each set of these sections being interconnected by means of universal joints indicated at 49 and 50, and all of the shafts are adapted to receive rotation from beveled gears 51 and 52. The beveled gears 51 and 52 are driven by means of a main drive gear 53 which is mounted upon a main drive or control shaft 54. The shaft 54 extends substantially throughout the entire length of both wing sections, as is best illustrated in Fig. 1, and is provided with suitable driving means indicated by reference numeral 55, such driving means comprising a geared wheel 56 which is adapted to be driven in any suitable manner such as by means of a chain and crank, indicated at 57. It will be understood that the worm gear control provides a lock which prevents the panels, comprising the front and rear adjustable sections, from being moved from their adjusted position while the airplane is under the action of the wind forces during flight.

Fig. 7 indicates the manner in which a wing embodying this invention may be adjusted for varying the camber of the airfoil to meet any desirable flying conditions. The position of the front and rear sections, shown in the full line view, indicate a camber which is perhaps best suited for ordinary flight. The dotted line position A shows a high camber suitable for leaving the ground or landing at low speed, and the dotted line position B illustrates an extreme low camber which might be obtained for high speed conditions.

The interfitting parts of the panels and the center section are rounded or curved, as indicated at 59, to provide suitable stream line conditions which will reduce the factor of wind resistance, and it will be understood that the cross-sectional shape of the total wing section, the number of panels employed, and the degree to which the camber may be adjusted are dependent largely upon design characteristics of the particular machine upon which the invention is used.

This invention contributes materially to the satisfaction of a long felt need in the airplane industry, it is sturdy and simple in construction and may be easily adjusted, each adjustment of the panels being automatically locked against movement as a result of air forces by means of the worm gearing as has been previously pointed out.

It will be understood that, while I have herein described and illustrated one complete embodiment of the invention, it is not limited to the precise construction set forth but includes within its scope whatever changes fairly come within the spirit of the appended claims.

I claim as my invention:

1. An airplane wing construction embodying: a fixed center section comprising longitudinal spars and transverse main center ribs; front and rear adjustable sections, each comprising a plurality of panels, said panels including transverse segmental ribs pivotally interconnected to form units, said units being pivotally attached to said main center ribs; and means for imparting unitary adjustment to said panels for varying the convexity of said front and rear sections relative to said center section, said segmental ribs being interconnected by means of plates rigidly mounted thereon and pivotally connected with adjacent segmental ribs.

2. An airplane wing construction embodying: a fixed center section comprising longitudinal spars and transverse main center ribs; front and rear adjustable sections, each comprising a plurality of panels, said panels including transverse segmental ribs pivotally interconnected by pivot plates to form units, said units being pivotally attached to said main center ribs; and means for imparting unitary adjustment to said panels for varying the convexity of said front and rear sections relative to said center section, said adjusting means comprising interconnected gear units mounted upon said pivot plates in each panel and a control shaft operably connected with all of said gear units.

3. A wing construction for an airplane embodying: a center section comprising longitudinal spars and transverse ribs, said transverse ribs being arranged to support pivot shafts adjacent opposite edges of said section; pivot shafts rotatably mounted in said ribs; pivot plates rigidly mounted on said pivot shafts; segmental ribs secured to said pivot plates and adapted to receive segmental rotation about the edges of said center section, said segmental ribs being embodied in panel units tapering outwardly from said center section to form a uniformly surfaced airfoil.

said pivot plates and gear means connecting said control shafts with said pivot shafts for imparting movement from said control shafts to said segmental ribs, each of said gear means comprising a worm on the control shaft, an interconnecting shaft supported by oppositely disposed pivot plates, a worm wheel on one end of said interconnecting shaft, engaging said control shaft worm, a worm on the opposite end of said interconnecting shaft, and a gear member mounted on said pivot shaft in engagement with said last mentioned worm, and a main drive shaft adapted to synchronously rotate said control shafts, and means, in the cockpit of said airplane for operating said main drive shaft.

In testimony whereof, I have hereunto set my hand at Los Angeles, California, this 24th day of November, 1931.

HERBERT J. HOGAN.